United States Patent
Kaplan et al.

(10) Patent No.: US 6,584,453 B1
(45) Date of Patent: *Jun. 24, 2003

(54) REVERSIBLE MOVE/MERGE OPERATION FOR A GENERAL LEDGER

(75) Inventors: Donald H. Kaplan, Tenafly, NJ (US); Rondy Chi-Tsung Ng, Redwood Shores, CA (US); Sharif M. Rahman, San Mateo, CA (US)

(73) Assignee: Oracle Corporation, Redwood Shores, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 78 days.

(21) Appl. No.: 09/138,029
(22) Filed: Aug. 21, 1998
(51) Int. Cl.$^7$ .............................................. G06F 17/60
(52) U.S. Cl. ............................ 705/39; 705/30; 705/35; 705/40
(58) Field of Search ............................. 705/30, 35, 39, 705/40

(56) References Cited

U.S. PATENT DOCUMENTS

| | | | |
|---|---|---|---|
| 4,885,685 A | * 12/1989 | Wolfberg et al. | 364/401 |
| 5,117,356 A | * 5/1992 | Marks | 364/406 |
| 5,220,501 A | * 6/1993 | Lawlor et al. | 364/408 |
| 5,390,113 A | * 2/1995 | Sampson | 364/419.19 |
| 5,604,853 A | * 2/1997 | Nagashima | 395/803 |
| 5,659,165 A | * 8/1997 | Jennings et al. | 235/379 |
| 5,933,593 A | * 8/1999 | Arun et al. | 395/182.04 |
| 5,958,004 A | * 9/1999 | Helland et al. | 709/101 |
| 5,996,088 A | * 11/1999 | Frank et al. | 714/6 |
| 6,006,204 A | * 12/1999 | Malcolm | 705/30 |
| 6,058,375 A | * 5/2000 | Park | 705/30 |

FOREIGN PATENT DOCUMENTS

WO WO 95/04659 * 2/1995 ............ B42D/15/10

OTHER PUBLICATIONS

The Use of Databases to Enhance accounting Information; Patricia A. Essex, Feb, 1997, Th ohio CPA Journal.*

Client/serever accounting: accounting systems based on client/server architectures increase productivity. McKie, Stewart, DBMS, v6, n2, p62(5), Feb., 1993.*

(List continued on next page.)

*Primary Examiner*—Eric W. Stamber
*Assistant Examiner*—Yehdega Retta
(74) *Attorney, Agent, or Firm*—Park, Vaughan & Fleming LLP (57) ABSTRACT

One embodiment of the present invention provides a system for moving balances from at least one source account into a target account and subsequently reversing the movement. The system operates by receiving a request for a move/merge operation to move the balances from source accounts to the target account. In response to the request, the system creates a list of changes to the source accounts and the target account that are involved in moving the balances. The system stores this list of changes into a memory for later retrieval during a move/merge reversal operation. Next, the system performs the move/merge operation by applying the list of changes to the source accounts and the target account. When the system subsequently receives a request to reverse the move/merge operation, the system reverses the move/merge operation by retrieving the list of changes from the memory and applying the inverse of changes in the list to the source accounts and the target account. In a variation on the on above-embodiment, the system validates the move/merge operation according to a set of business rules before performing the move/merge operation. For example, the set of business rules may ensure that the source and target accounts belong to the same financial statement category or the same business entity. In a further variation on the above embodiment, the system additionally creates move/merge audit journal entries to facilitate future auditing of the changes made during the move/merge operation.

14 Claims, 5 Drawing Sheets

OTHER PUBLICATIONS

Data Reengineering Fits The Bill; Process eases transition form legacy applications to client–server systems.Informationweek, May 26, 1997; Peter Aiken.*

Bellone, Robert; Cohn, Michael; M.Y.O.B; Accounting Technology; v12n5 pp: 28–31, Jun. 1996.*

Cohn Michael; Bellone Robert; Changes in the wind; Accounting Technology v12n6 pp: 21–30, Jul. 1996.*

Bellone, Roberts; Swiss–army accounting software; Accounting Technology; v13n4, pp: 26–37, May 1997.*

Dauphinias et al.; Accounting for Individual Tastes; PC Magazine; v4, n4, p 200–207, Feb. 1985.*

Davis; Low–end accounting software; Accounting Today; New York.*

Giovetti; Client write–up: Conquer the mountain; Accounting Technology; Boston, Oct. 1995.*

Giovetti; Accounting software update; Accounting Technology; Boston, Jul. 1995.*

Salmon; Accounting with a mouse; Accounting Today; New York, Jan. 1994.*

Oracle General Ledger User's Guide, pp. 6–122 through 6–135.

* cited by examiner

| PERIOD | TRANSACTIONS | BALANCE ADJUSTMENT |
|---|---|---|
| 1/90 | +20<br>+30 | -50 |
| 2/90 | +40 | -40 |
| 3/90 | +10<br>+60<br>+10 | -80 |
| 4/90 | +60 | -60 |

SOURCE ACCOUNT 600

| PERIOD | BALANCE ADJUSTMENT |
|---|---|
| 1/90 | +50 |
| 2/90 | +40 |
| 3/90 | +80 |
| 4/90 | +60 |

TARGET ACCOUNT 610

FIG. 6

REVERSIBLE MOVE/MERGE OPERATION FOR A GENERAL LEDGER

BACKGROUND

1. Field of the Invention

The present invention relates to computer-based accounting systems. More specifically, the present invention facilitates reversibly moving or merging account balances from at least one source account into a target account in a general ledger accounting system.

2. Related Art

Move/merge operations are often used in general ledger accounting systems to facilitate corporate restatements, reclassifications or chart of account modifications. As the name implies, a move/merge operation moves balances from one account to another or "merges" multiple balances into one.

Move/merge operations can be used for a variety of reasons. (1) A move/merge operation can be used to reflect the results of a corporate reorganization where the responsibility for a cost center is moved and the cost center number is changed to fit into the numbering scheme of the new owner. (2) In another example, when two organizations are being merged, a move/merge operation can be used to compare current balances of the merged organization against the combined balances of the separate organizations. (3) A move/merge operation can additionally be used to change a general ledger account number to facilitate a change in reporting requirements; for example, in moving a balance from an asset to a liability or from a revenue to an expense.

Many existing general ledger systems provide move/merge functionality. However, this move/merge functionality is not well-controlled. In current systems, move/merge operations are typically run in batch mode, with little if any error checking. Balances can be moved between balance sheet and income statement accounts, changing historical balances from those previously reported, and even causing an entity's balance sheet to no longer balance. In current systems, it is even possible to move balances from one legal entity to another, causing the general ledger of each legal entity to be out of balance.

Additionally, once move/merge operations are processed, there is presently no easy way to "undo" the results of the move/merge operation. The only way to undo a move/merge operation is to restore general ledger balances back to a prior version of the general ledger balances, and to repost any entries subsequently posted after the move/merge operation. Hence, a user is typically unable "undo" the results of a move/merge operation because the undo operation must typically be performed with MIS resources.

Finally, in current systems, when balances in the general ledger are moved, the balances no longer reconcile back to the subledger that created the transactions. For example, assume the general ledger has one accounts payable account, which is only posted by the accounts payable system. In this case, the general ledger can be reconciled back to the accounts payable system. However, if the accounts payable balance is moved to another account, reconciliation is no longer possible.

In some systems, the user has the option of changing the underlying transactions to identify the target account instead of the source account. If the transactions are changed, the general ledger balance is supported by the posted transactions. However, there is no longer a link between the general ledger transactions and the transactions sent to the general ledger by the subledger. Consequently, if the transactions are not changed to reflect the target account, the balances in the general ledger can no longer be reconciled back to the underlying transactions.

Hence, what is needed is a system that supports a move/merge operation can be easily reversed without undesirable side effects.

SUMMARY

One embodiment of the present invention provides a system for moving balances from at least one source account into a target account and subsequently reversing the movement. The system operates by receiving a request for a move/merge operation to move the balances from source accounts to the target account. In response to the request, the system creates a list of changes to the source accounts and the target account that are involved in moving the balances. The system stores this list of changes into a memory for later retrieval during a move/merge reversal operation. Next, the system performs the move/merge operation by applying the list of changes to the source accounts and the target account. When the system subsequently receives a request to reverse the move/merge operation, the system reverses the move/merge operation by retrieving the list of changes from the memory and applying the inverse of changes in the list to the source accounts and the target account. In a variation the on above-embodiment, the system validates the move/merge operation according to a set of business rules before performing the move/merge operation. For example, the set of business rules may ensure that the source and target accounts belong to the same financial statement category or the same business entity. In a further variation on the above embodiment, the system additionally creates move/merge audit journal entries to facilitate future auditing of the changes made during the move/merge operation.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Distributed Computing System

Figure 1:
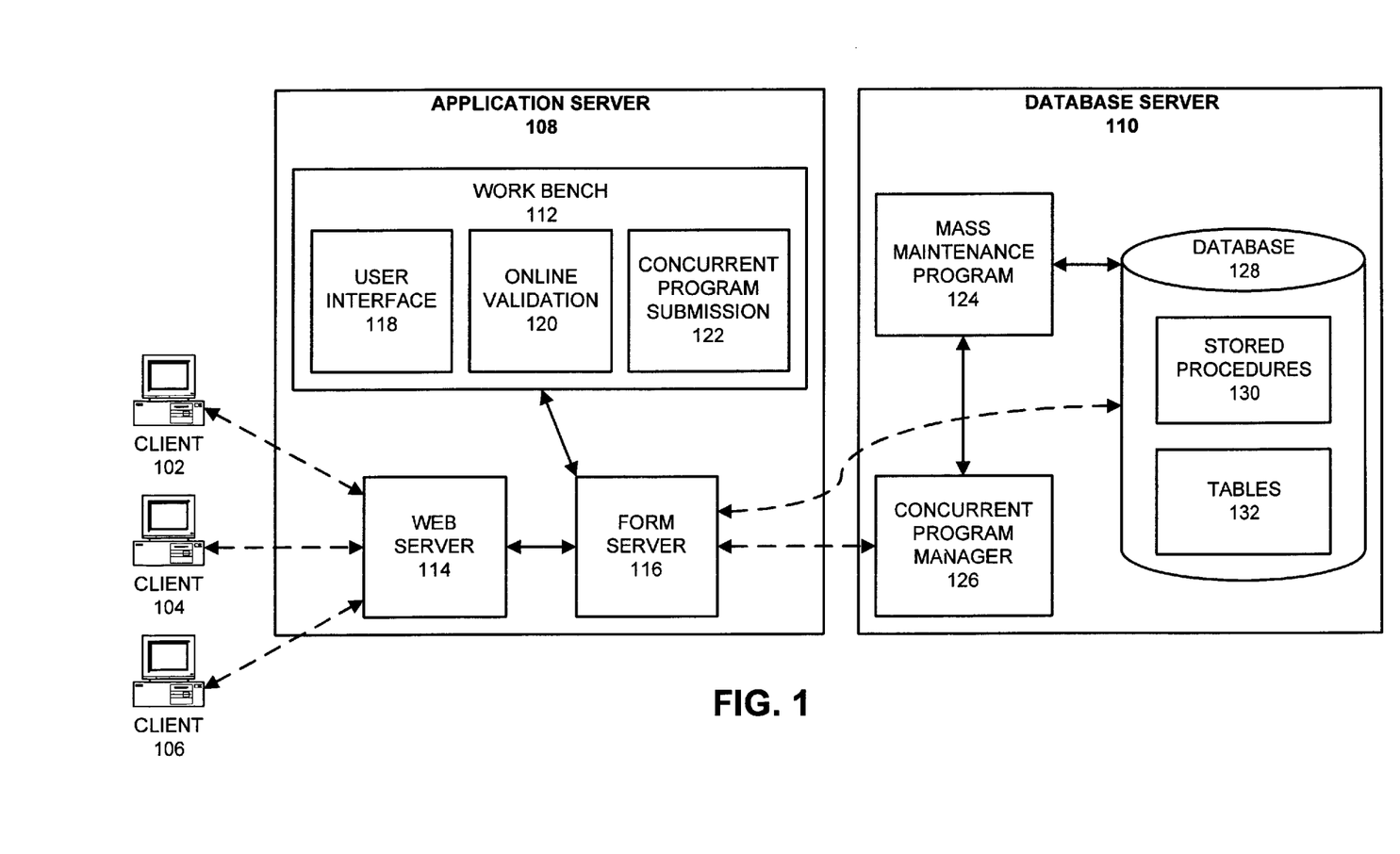
FIG. 1 illustrates a distributed computing system in accordance with an embodiment of the present invention.

FIG. 1 illustrates a distributed computing system in accordance with an embodiment of the present invention. The distributed system illustrated in FIG. 1 includes clients 102, 104 and 106, which are coupled to application server 108 and database server 110 through a communication network (not shown). This communication network may be any type of wire or wireless link between computers, including, but not limited to, a local area network, a wide area network, or a combination of networks. In one embodiment of the present invention, the communication network includes the Internet. In another embodiment, the communication network includes multiple networks, including a local area network and the Internet.

Clients 102, 104 and 106 may include any node on a computer network with computational capability and including a mechanism for communicating across the communication network. For example, clients 102, 104 and 106 may be personal computers, workstations, mainframe computers or network computers. Clients 102, 104 and 106 may contain a browser program (not shown), which allows a user to navigate through a collection of data, such as a web site, on a remote server computer system.

In the illustrated embodiment, Clients 102, 104 and 106 are coupled to application server 108, which implements a front-end portion of the move/merge functionality. Application server 108 is coupled to database sever 110, which implements a back-end portion of the move/merge functionality. In general, application server 108 and database server 110 may include any node on a computer network including computational capability, and possibly data storage capability, as well as a mechanism for servicing requests from clients 102, 104 and 106 for computational or data storage resources.

In the embodiment illustrated in FIG. 1, application server 108 includes workbench 112, web server 114 and form server 116. Workbench 112 is a form that facilitates the inputting of data and commands for move/merge functionality. To this end, workbench 112 includes user interface 118, online validation unit 120 and concurrent program submission unit 122. User interface 118 handles the displaying of forms and the receiving of input through forms to specify the move/merge functionality.

Input received through user interface 118 is processed through online validation unit 120, which validates commands received through user interface 118. This validation may include determining whether commands received through user interface 118 adhere to a set of business rules, which are described in more detail below with reference to FIG. 3.

After a command has been validated, it is passed on to concurrent program submission unit 122, which initiates the move/merge process. Concurrent program submission unit 122 transmits the commands to form server 116, which is responsible for executing the front-end portion of a move/merge operation. Form server 116 generally coordinates the processing of commands and data received through forms. To this end, form server 116 additionally communicates with database server 110 and web server 114. Database server 110 processes the back-end portion of move/merge operations, and is described in more detail below.

Web server 114 is an application program residing on application server 108 that facilitates the presentation of at least one website to clients 102, 104 and 106. To this end, web server 114 presents inter-linked pages of text, graphical images and programs to be accessed by browsers on clients 102, 104 and 106. In the illustrated embodiment, web server 114 is accessible from any browser coupled to the World Wide Web via the Internet. This includes browsers located on clients 102, 104 and 106.

In the illustrated embodiment, database server 110 includes mass maintenance program 124, concurrent program manager 126 and database 128. Mass maintenance program 124 includes functions that implement move/merge and account creation functions. Mass maintenance program 124 communicates with concurrent program manager 126. Concurrent program manager 126 receives job requests from form server 116, and handles scheduling of jobs as well as back end processing for move/merge operations. Mass maintenance program 124 additionally communicates with database 128.

Database 128 includes stored procedures 130 and tables 132. Stored procedures 130 includes a variety of procedures for handling data received from forms, including procedures to perform online validation as well as record manipulation. Tables 132 include a general ledger schema specifying static tables that hold account balances as well as interim tables that facilitate move/merge functionality. As illustrated in FIG. 1, database server 110 additionally communicates with form server 116.

The system illustrated in FIG. 1 operates generally as follows. Users on clients 102, 104 and 106 interact with workbench 112 through web server 114 and form server 116. A user inputs a request for a move/merge operation into a form through user interface 118. This request is first checked against a set of business rules through online validation unit 120. If the form contains a valid request, the request is forwarded to concurrent program submission unit 122, which forwards the command to concurrent program manager 126 through form server 116.

In response to the command, concurrent program manager 126 schedules a job to execute code from mass maintenance program 124. Mass maintenance program 124 communicates with database 128 to perform the move/merge operation. The move/merge operation is accomplished by manipulating tables 132 and through use of stored procedures 130. These tables are described in more detail below with reference to FIG. 2.

Tables

Figure 2:
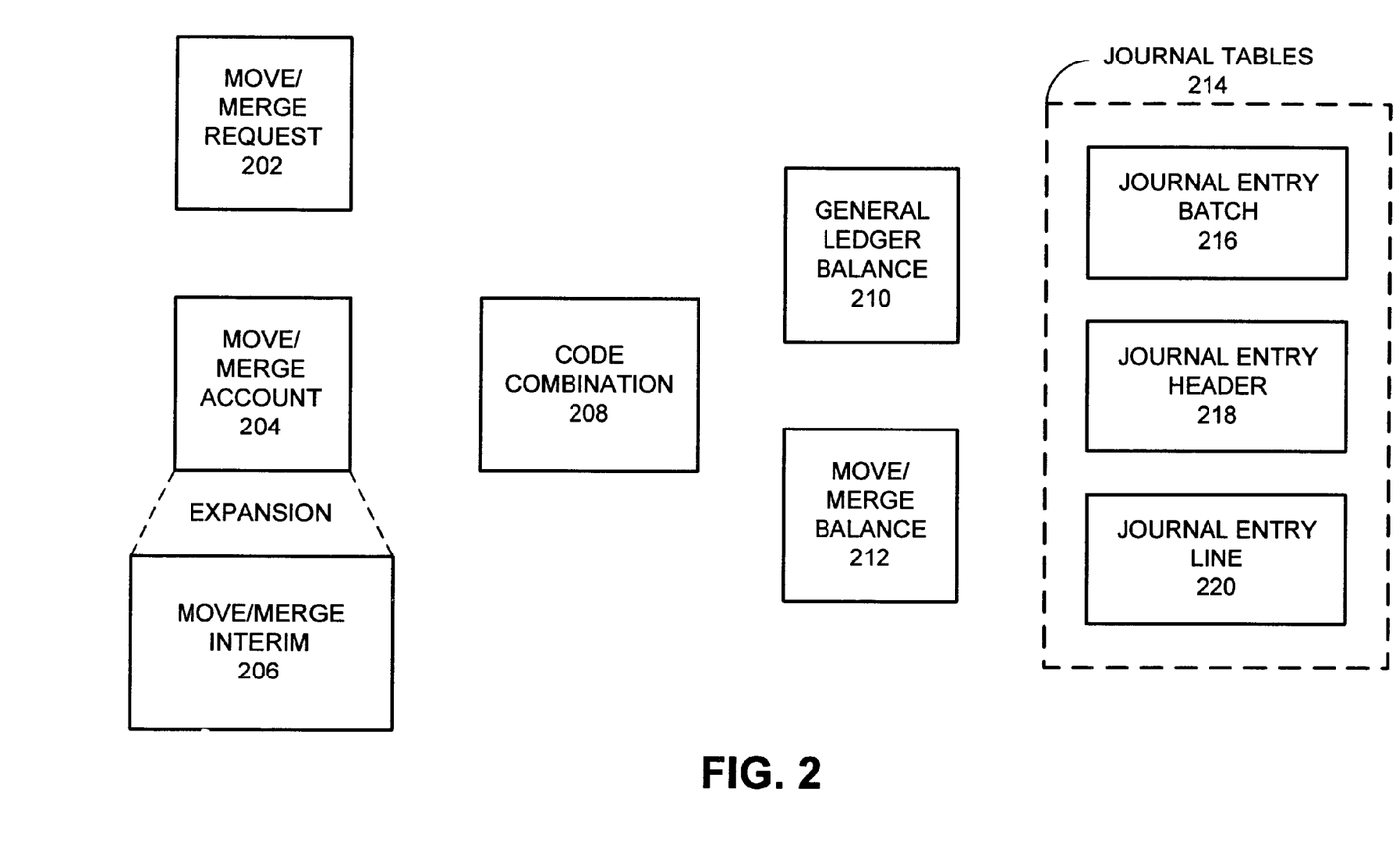
FIG. 2 illustrates various tables used to perform a move/merge operation and to reverse a move/merge operation in accordance with an embodiment of the present invention.

FIG. 2 illustrates some of the tables used to perform a move/merge operation and to reverse a move/merge operation in accordance with an embodiment of the present invention. FIG. 2 includes move/merge request table 202, move/merge account table 204, move/merge interim table 206, code combination table 208, general ledger balance table 210, move/merge balance table 212 and journal tables 214. Move/merge request table 202 contains move/merge request information received from forms. Move/merge account table 204 contains a mapping from source to target accounts for the move/merge operation. This mapping may be specified using "wild cards" in some of the account fields. Move/merge interim table 206 contains the same mapping, except that the wild cards are expanded into multiple accounts.

Code combination table 208 contains a listing of all of the valid accounts that can be posted to. The system uses code combination table 208 to validate move/merge requests by verifying that a given move/merge request specifies valid accounts.

General ledger balance table 210 stores balances for each account. In table 210, this balance information is associated with account identification information, period identification information and currency identification information. During a move/merge operation, the balances in general ledger balance table 210 are changed to reflect movement of account balances from at least one source account into a target account.

Move/merge balance table 212 contains a period-by-period listing of the balances that need to be moved to perform a move/merge operation. This table is used to modify general ledger balances table both to perform a move/merge operation and to undo a move/merge operation.

Journal tables 214 contain journal entries that facilitate future auditing of the transactions involved in the move/merge process. Journal tables 214 includes journal entry batch table 216, journal entry header table 218 and journal entry line table 220. Journal entry line table 220 contains journal entries for individual debit and credit operations that are involved in various general ledger operations including the move/merge process. Journal entry header table 218 includes journal entries for changes to groups of lines. For example, journal entry header table 218 may include journal entries to reflect changes in lines grouped by currency. Finally, journal entry batch table 216 contains entries for groups of headers. For example, headers can be grouped on a period-by-period basis.

Move/Merge Operation

Figure 3:
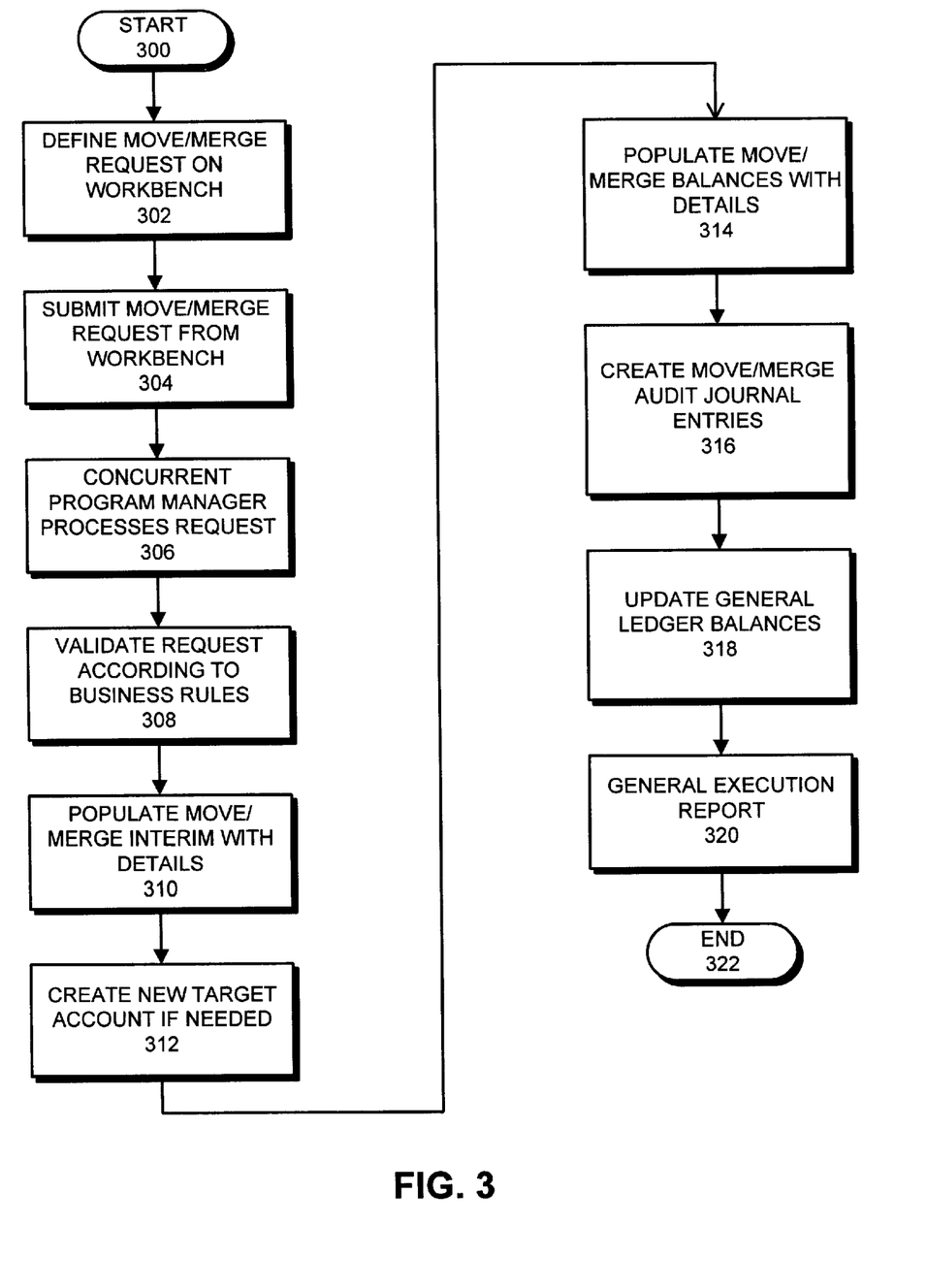
FIG. 3 is a flow chart illustrating some of the steps involved in performing a move/merge operation in accordance with an embodiment of the present invention.

FIG. 3 is a flow chart illustrating some of the steps involved in performing a move/merge operation in accordance with an embodiment of the present invention. The system begins by allowing a user on one of clients 102, 104 or 106 to define a move/merge request through workbench 112 within application server 108 from FIG. 1 (state 302). This definition process involves specifying source and target accounts. Accounts can either be specified using all segments of a code combination for a general ledger account, or by using a partially specified combination, with less than all segments specified. (In this case, the unspecified segments are "wild cards," because they can assume any segment value.) During the request entry process, the move/merge request is validated through online validation unit 120 within workbench 112.

Next, concurrent program submission unit 122 within workbench 112 submits the move/merge request from workbench 112 to concurrent program manager 126 in database server 110 (state 304). Concurrent program manager 126 next processes the request, which involves scheduling jobs associated with the request (state 306). These jobs execute code from mass maintenance program 124 to perform the move/merge operation.

The system next validates the request according to a set of business rules (state 308). This entails reading account information from both move/merge request table 202 and move/merge account table 204. In one embodiment of the present invention, these business rules include the following rules. (1) Move/merge operations cannot cross legal entities. (2) Move/merge operations cannot cross financial statement categories. (However, crossing account types within financial statement categories is allowed.) (3) Source and target account input formats must be the same. (4) Source accounts must exist and be enabled. (5) Each source account within a move/merge operation must be unique. (6) If a target account exists, it must be enabled. Note that target accounts need not exist beforehand; they can be created during the move/merge process.

The system next populates move/merge interim table 206 (state 310). This process entails possibly expanding wildcard segment values from move/merge account table 204 into multiple accounts. This expansion process is accomplished by reading from both move/merge account table 204 and code combination table 208, and writing the expanded account information to move/merge interim table 206.

Next, the system creates a new target account if necessary (state 312). This entails reading from move/merge interim table 206—to determine which target accounts are required—and possibly writing to code combination table 208 to insert information for the new target account.

Next, the system populates move/merge balance table 212 with details of account balance movements to from source account to target accounts on a period-by-period basis (state 314). This entails reading account information from general ledger balance table 210 and move/merge interim table 206, and writing the details of account balance movements into move/merge balance table 212.

The system next creates move/merge audit journal entries to facilitate future auditing of changes made during the move/merge operation (state 316). This entails reading move/merge balance table 212 to determine how the accounts are changed during the move/merge process, and writing corresponding entries in journal tables 214.

Next, the system updates general ledger balances in general ledger balance table 210 (state 318). This entails reading move/merge balance table 212 to determine which balances to update, and writing the changes to general ledger balance table 210.

Finally, the system generates an execution report for the move/merge operation (state 320). This entails reading move/merge interim table 206 and journal tables 214 to determine what happened during the move/merge operation and then generating an execution report from this information. The above process is repeated for each move/merge operation performed by the system.

Move/Merge Reversal

Figure 4:
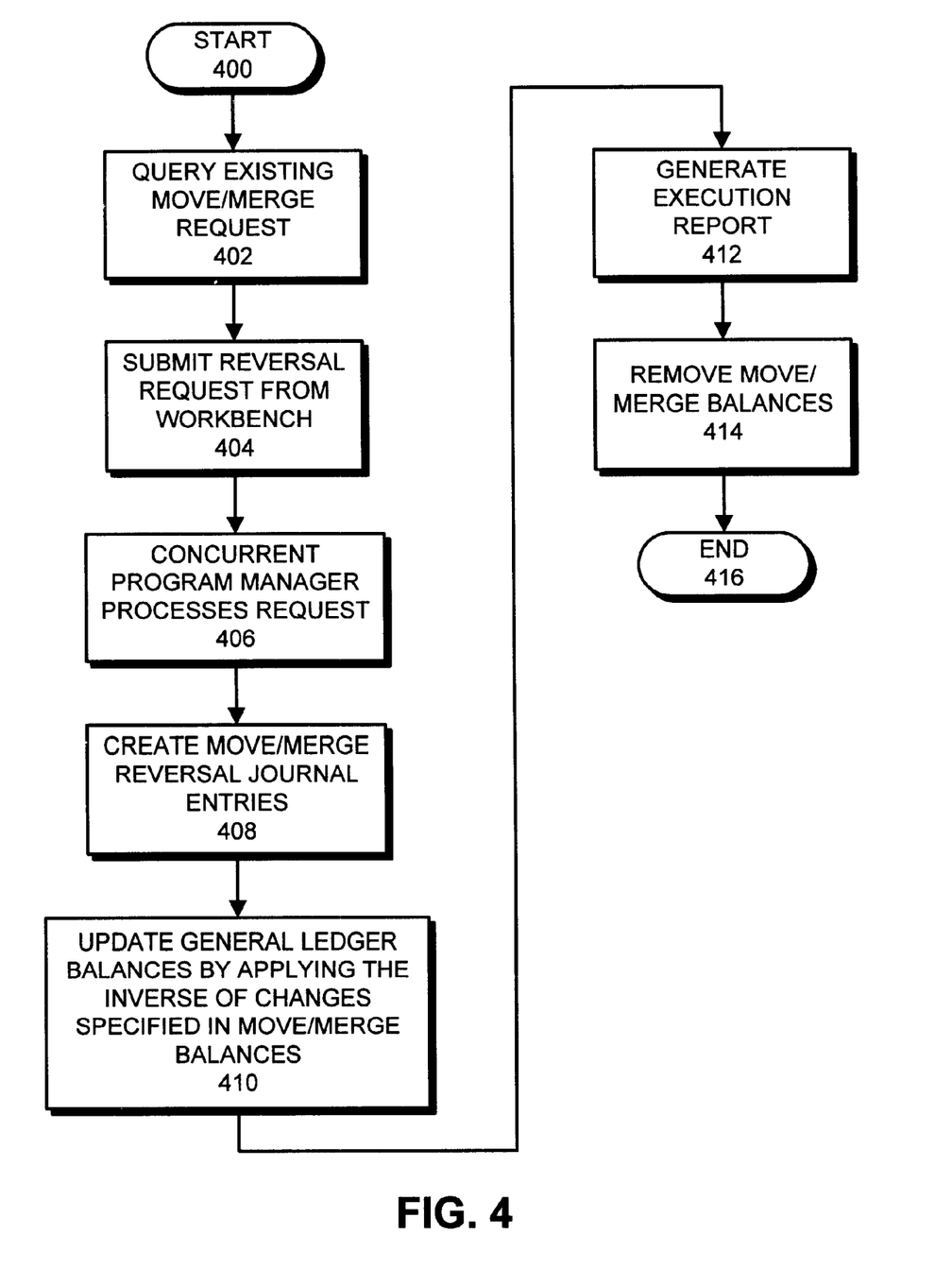
FIG. 4 is a flow chart illustrating some of the steps involved in a performing a move/merge reversal operation in accordance with an embodiment of the present invention.

FIG. 4 is a flow chart illustrating some of the steps involved in performing a move/merge reversal operation in accordance with an embodiment of the present invention. The system begins with a query to an existing request through a workbench 112 (state 402). When the user decides to reverse the request he inputs a reversal request into workbench 112. In response to the input, concurrent program submission unit 122 within workbench 112 submits the move/merge reversal request from workbench 112 to concurrent program manager 126 in database server 10 (state 404). Concurrent program manager 126 next processes the reversal request, which involves scheduling jobs associated with the request (state 406). These jobs execute code from mass maintenance program 124 to perform the move/merge reversal operation.

The system next creates audit journal entries for the reversal operation, to facilitate future auditing of changes made during the move/merge reversal operation (state 410). This entails reading move/merge balance table 212 to determine how the accounts are changed during the move/merge reversal process, and writing corresponding entries in journal tables 214.

Next, the system updates general ledger balances in general ledger balance table 210 (state 410). This entails reading move/merge balance table 212 to determine which balances were changed during the move/merge operation, and then applying the inverse of the specified the changes to general ledger balance table 210 in order to reverse to move/merge operation.

Next, the system generates an execution report for the move/merge operation (state 412). This entails reading move/merge interim table 206 and journal tables 214 to determine what happened during the move/merge reversal operation and then generating an execution report from this information.

Finally, after the reversal operation is complete, the system automatically removes the entries in move/merge balance table 212. This prevents a user from applying the reversal operation a second time, and also prevents the user from reversing the reversal operation.

The above process is repeated for each move/merge reversal operation performed by the system.

Viewing Journal Entries

Figure 5:
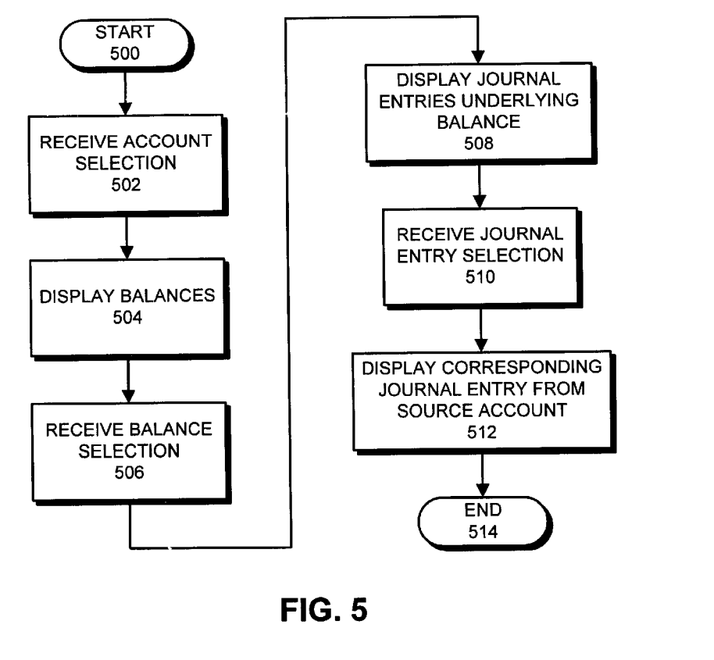
FIG. 5 is a flow chart illustrating some of the steps involved allowing a user to view journal entries from an account after a move/merge operation has completed in accordance with an embodiment of the present invention.

FIG. 5 is a flow chart illustrating some of the steps involved allowing a user to view journal entries from an account after a move/merge operation has completed in accordance with an embodiment of the present invention. This embodiment allows a user to drill down from an account balance to view all of the journal entries that affected the account balance, including move/merge journal entries. From the audit journal entries for a target account, the user can drill back to the source account and into the source account's detailed transactions. From a source detail transaction, it is even possible to drill back into a supporting subledger.

The flow chart in FIG. 5 illustrates how user interface 118 within workbench 112 allows a user to drill down into move/merge journal entries. The system first receives a selection of an account from a user (state 502). It next displays the balances associated with the account (state 504). After receiving a selection of one of the balances from a user (state 506), the system displays the journal entries that underlie the balance. If a journal entry is from a move/merge operation, the system can receive a selection for the journal entry from the displayed journal entries (state 510), and can then display a corresponding journal entry from the source account (state 512).

The above-described user interface allows a user to ensure the financial integrity of both source and target accounts after a move/merge operation.

Example

Figure 6:
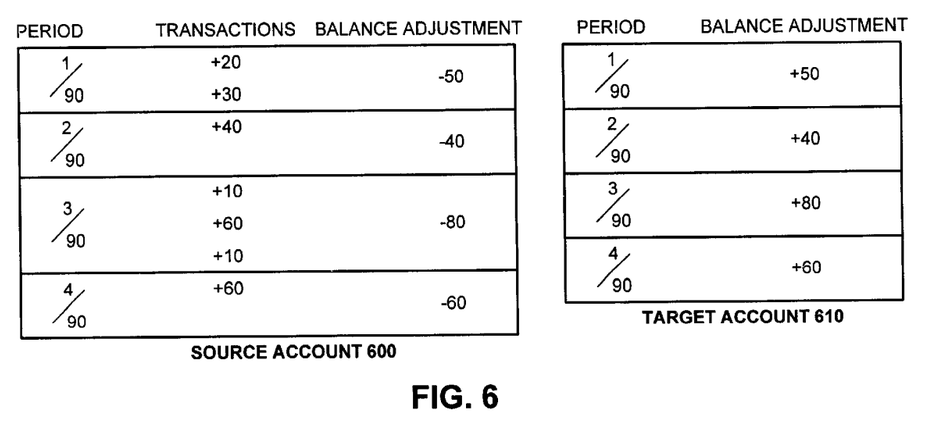
FIG. 6 illustrates an example of a move/merge operation in accordance with an embodiment of the present invention.

FIG. 6 illustrates an example of a move/merge operation in accordance with an embodiment of the present invention. In this example, a source account 600 is moved to a target account 610. Source account 600 includes four monthly periods 1/90, 2/90, 3/90 and 4/90. In 1/90 there are two transactions, +20 and +30. In 2/90 there is one transaction, +40. In 3/90 there are three transactions, +10, +60 and +10. In 4/90 there is one transaction, +60.

During the move/merge operation, the monthly balances for 1/90, 2/90, 3/90 and 4/90 in source account 600 are zeroed out by applying balance adjustments of −50, −40, −80 and −60, respectively, to the monthly balances. In target account 610, offsetting adjustments of +50, +40, +80 and +60 are made to create a transfer of the balances from source account 600 to target account 610.

During a reversal operation, the inverse operations are applied to source account 600 and target account 610. More specifically, balance adjustments of +50, +40, +80 and +60 are applied to source account 600 and balance adjustments of −50, −40, −80 and −60 are applied to target account 610. Note that balance adjustments for the move/merge process and the move/merge reversal process offset each other.

Conclusion

The present invention facilitates moving general ledger balances from one account to another and merging multiple general ledger balances into a single account. This move/merge process only moves actual balances, and not budgets or encumbrances. Balances are updated directly, not through posted journal entries.

The present invention provides a number of advantages. A user can process a move/merge request and can then easily reverse the process. Financial integrity is provided by allowing a user to view and report all transactions affecting the account balances. This includes viewing move/merge journal entries. The present invention additionally provides an audit trail from the target account back to the source account, and even back to the source transactions that created the source account balance.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention; the scope of the invention is limited only by the appended claims.

What is claimed is:

1. A method for moving balances from at least one source account into a target account during a move/merge operation that facilitates reversing the movement, comprising:

receiving a request at a computer program to perform the move/merge operation to move the balances from the at least one source account to the target account;

in response to receiving the request, automatically performing the move merge operation under control of the computer program by, validating the move/merge operation according to a set of business rules before performing the move/merge operation, including retrieving account information from database tables, verifying that the at least one source account and the target account belong to the same business entity, and verifying that the at least one source account and the target account belong to the same financial statement category, creating the target account using data from database tables if the target account does not already exist, creating a list of changes to the at least one source account and the target account that are involved in moving the balances, storing the list of changes into a persistent memory for later retrieval during a move/merge reversal operation, and performing the move/merge operation by applying the list of changes to the at least one source account and the target account;

receiving a request to reverse the move/merge operation at the computer program; and in response to the request, automatically reversing the move/merge operation under control of the computer program by, retrieving the list of changes from the persistent memory, determining inverse changes to undo the changes in the list of changes, and applying the inverse changes to the at least one source account and the target account.

2. The method of claim 1, further comprising purging the list of changes from the persistent memory after reversing the move/merge operation.

3. The method of claim 1, further comprising creating move/merge audit journal entries to facilitate future auditing of changes made during the move/merge operation.

4. The method of claim 1, further comprising generating an execution report containing details of the move/merge operation.

5. The method of claim 1, wherein applying the list of changes includes applying changes to the balances in the at least one source account and the target account.

6. The method of claim 1, wherein applying the list of changes includes applying changes to prior transactions involving the at least one source account.

7. A method for moving balances from at least one source account into a target account during a move/merge operation and later reversing the movement, comprising:
    receiving a request at a computer program to perform the move/merge operation to move the balances from the at least one source account to the target account;
    in response to receiving the request, automatically performing the move merge operation under control of the computer program by,
        validating the move/merge operation according to a set of business rules before performing the move/merge operation, including retrieving account information from database tables, verifying that the at least one source account and the target account belong to the same business entity, and verifying that the at least one source account and the target account belong to the same financial statement category,
        creating a list of changes to balances in the at least one source account and the target account that are involved in moving the balances,
        storing the list of changes into a persistent memory for later retrieval during a move/merge reversal operation,
        creating the target account using data from database tables if the target account does not already exist, and
        performing the move/merge operation by applying the list of changes to the at least one source account and the target account;
    receiving a request to reverse the move/merge operation at the computer program; and
    in response to the request, automatically reversing the move/merge operation under control of the computer program by,
        retrieving the list of changes from the persistent memory,
        determining inverse changes to undo the changes in the list of changes, and
        applying the inverse changes to the at least one source account and the target account.

8. A program storage device storing instructions that when executed by a computer cause the computer to perform a method for moving balances from at least one source account into a target account and later reversing the movement, the method comprising:
    receiving a request at a computer program to perform the move/merge operation to move the balances from the at least one source account to the target account;
    in response to receiving the request, automatically performing the move merge operation under control of the computer program by,
        validating the move/merge operation according to a set of business rules before performing the move/merge operation, including retrieving account information from database tables, verifying that the at least one source account and the target account belong to the same business entity, and verifying that the at least one source account and the target account belong to the same financial statement category,
        creating a list of changes to the at least one source account and the target account that are involved in moving the balances,
        creating the target account using data from database tables if the target account does not already exist,
        storing the list of changes into a persistent memory for later retrieval during a move/merge reversal operation, and
        performing the move/merge operation by applying the list of changes to the at least one source account and the target account;
    receiving a request to reverse the move/merge operation at the computer program; and
    in response to the request, automatically reversing the move/merge operation under control of the computer program by,
        retrieving the list of changes from the persistent memory,
        determining inverse changes to undo the changes in the list of changes, and
        applying the inverse changes to the at least one source account and the target account.

9. An apparatus that moves balances from at least one source account into a target account during a move/merge operation and that facilitates reversing the movement, comprising:
    a computer system;
    a receiving mechanism, within the computer system, that receives a request for a move/merge operation to move the balances from the at least one source account to the target account;
    a list creating mechanism, within the computer program, that in response to the request for the move/merge operation being received by the receiving mechanism automatically creates a list of changes to the at least one source account and the target account that are involved in moving the balances;
    an account creation mechanism that creates the target account using data from database tables if the target account does not already exist;
    a persistent memory, within the computer system, that stores the list of changes for later retrieval during a move/merge reversal operation; and
    an execution mechanism, within the computer program, that performs the move/merge operation by applying the list of changes to the at least one source account and the target account;
    wherein the receiving mechanism is configured to receive a request to reverse the move/merge operation; and
    wherein the execution mechanism is configured to automatically reverse the move/merge operation upon receiving the request to reverse the move/merge operation by,
        retrieving the list of changes from the persistent memory, and by
        applying an inverse of changes in the list to the at least one source account and the target account;
    wherein the execution mechanism is configured to validate the move/merge operation according to a set of business rules before performing the move/merge operation, including retrieving account information from database tables, verifying that the at least one source account and the target account belong to the same business entity, and verifying that the at least one source account and the target account belong to the same financial statement category.

10. The apparatus of claim 9, wherein the execution mechanism is configured to purge the list of changes from the persistent memory after reversing the move/merge operation.

11. The apparatus of claim 9, further comprising a journal creation mechanism that is configured to create move/merge audit journal entries to facilitate future auditing of changes made during the move/merge operation.

12. The apparatus of claim 9, further comprising a report generation mechanism that generates an execution report containing details of the move/merge operation.

13. The apparatus of claim 9, wherein the execution mechanism is configured to apply changes to the balances in the at least one source account and the target account.

14. The apparatus of claim 9, wherein the execution mechanism is configured to apply changes to prior transactions involving the at least one source account.

* * * * *